(12) United States Patent
Stanton (10) Patent No.: US 11,825,782 B2
(45) Date of Patent: Nov. 28, 2023

(54) AUTOMATIC BUCKING TOOL

(71) Applicant: Mark Stanton, Laytonville, CA (US)

(72) Inventor: Mark Stanton, Laytonville, CA (US)

( * ) Notice: Subject to any disclaimer, the term of this patent is extended or adjusted under 35 U.S.C. 154(b) by 324 days.

(21) Appl. No.: 17/374,594

(22) Filed: Jul. 13, 2021

(65) Prior Publication Data
US 2022/0369565 A1 Nov. 24, 2022

Related U.S. Application Data (60) Provisional application No. 63/192,523, filed on May 24, 2021.

(51) Int. Cl.
*A01G 3/00* (2006.01)

(52) U.S. Cl.
CPC .......... *A01G 3/00* (2013.01); *A01G 2003/005* (2013.01)

(58) Field of Classification Search
CPC .... A01G 2003/005; A01G 3/085; A01G 3/00; A01D 87/08
See application file for complete search history.

(56) References Cited

U.S. PATENT DOCUMENTS

| | | | | |
|---|---|---|---|---|
| 1,931,569 A | * | 10/1933 | Brown | A01G 3/00 30/212 |
| 2,051,862 A | * | 8/1936 | Kaplan | A01G 3/04 56/297 |
| 9,832,936 B2 | | 12/2017 | Ishiguro | |
| 10,925,213 B1 | * | 2/2021 | Cohen | A01D 45/16 |
| 2018/0317404 A1 | * | 11/2018 | Atteberry | A01D 46/22 |

FOREIGN PATENT DOCUMENTS

| | | |
|---|---|---|
| CN | 102523835 A | 7/2012 |
| CN | 202895262 U | 4/2013 |
| FR | 2808964 A1 | 8/2002 |

* cited by examiner

*Primary Examiner* — Monica L Perry
(74) *Attorney, Agent, or Firm* — Cynthia S. Lamon; Lamon Patent Services (57) ABSTRACT

An electric trimmer has an electric motor and power source, a pair of blade plates, at least one of which is connected to an oscillator mechanism in the electric motor, and a pair of guard plates disposed one on each side of the at least one of the pair of blade plates, the guard plates hosting a matching radial or linear pattern of slots having a uniform spacing, a uniform slot width, the slots breaking out past at least one edge of the guard plates, the guard plates, in assembly, creating a gap space there between. One or more operators may insert branches having buds or flowers thereon through any one of the matching slots in the slot pattern, the branch oriented orthogonal to the blade set with the blade plates oscillating to harvest the buds or flowers within the gap space.

18 Claims, 6 Drawing Sheets

AUTOMATIC BUCKING TOOL

CROSS-REFERENCE TO RELATED DOCUMENTS

The present invention claims priority to a U.S. provisional patent application Ser. No. 63/192,523 entitled Automatic Bucking Tool filed on May 2, 2021, disclosure of which is included herein at least by reference.

BACKGROUND OF THE INVENTION

1. Field of the Invention

The present invention is in the field of agriculture and pertains particularly to methods and apparatus for harvesting flowers or buds from flowering plants using an electric trimmer machine.

2. Discussion of the State of the Art

In the art of agriculture, many types of flowering plants are harvested by workers who cut branches and snip of the flowers of the harvested plant using manual snipping tools. Such flowering plants may include cannabis plants or other types of plants grown for their flowers or buds. Referring to cannabis plants, the typical height at harvest time may be about six to eight feet in height. The stalk of the plant may include numerous primary branches extending therefrom up to three to four feet out from the main stalk.

Each primary branch includes numerous secondary branches extending therefrom. Both primary and secondary branches may include multiple node sites or locations with buds or flowers that need to be collected from the plant, preferably in a non-mutated form, and preserved as the harvested portion of the plant. It is desired that these buds get removed in a manner than maintains their form and structure. The term bucking is used herein as a logging term adapted in cannabis farming to refer to the process of removing the buds and flowers from the secondary and primary branches of the plant stalk.

A challenge exists in the art of harvesting plants like cannabis for buds and flower in that the process of isolating and collecting them is manual and is very tedious and labor intensive which raises the costs of farming the plants commercially. Typically, a crew of workers is employed whereby the worker methodically cuts first and second branches from the main stalks and uses hand-operated clippers to snip off each bud individually. Another problem is such a repetitive physical process performed by the worker may cause strain and injury over the course of long hours of work during the harvest period.

Therefore, what is clearly needed is an electric trimming method and apparatus that may separate buds and flowers from secondary and primary branches of a harvested plant quickly without mutilating the form of the bud or flower.

BRIEF SUMMARY OF THE INVENTION

According to at least one embodiment of the present invention, an electric trimmer is provided having an electric motor and power source, a pair of blade plates, at least one of which is connected to an oscillator mechanism in the electric motor, and a pair of guard plates disposed one on each side of the at least one of the pair of blade plates, the guard plates hosting a matching radial or linear pattern of slots having a uniform spacing, a uniform slot width, the slots breaking out past at least one edge of the guard plates, the guard plates, in assembly, creating a gap space there between. One or more operators may insert branches having buds or flowers thereon through any one of the matching slots in the slot pattern, the branch oriented orthogonal to the blade set with the blade plates oscillating to harvest the buds or flowers within the gap space.

In one embodiment, the blade plates are one sided having cutting edges on one side of the blade set. In another embodiment, the blade plates are two sided blades having cutting edges on both sides of the blade set. In one embodiment, the branches are secondary branches of a cannabis plant. In a preferred embodiment, the guard plates are interchangeable parts stamped or sheared to form from sheet metal. In one embodiment, the power source for the electric trimmer is a rechargeable battery. In another embodiment, the power source for the electric trimmer is a power outlet accessed by a plug-in cord connected to the electric trimmer.

In one embodiment, the electric trimmer further includes a lock and unlock switch for unlocking the trimming assembly to enable dis-assembly and reassembly of the blade plates and guard plates. In one embodiment, the electric trimmer is mounted over or mounted to a container adapted to catch falling buds and flowers harvested during the trimming operation. In a variation of this embodiment, the trigger portion of the electric trimmer may be modified to enable the power to the blade set to remain on without human intervention. In one embodiment, the electric trimmer further includes a transparent safety shield mounted at about 45 degrees back from the blade set toward the operator side of the electric trimmer. In a preferred embodiment, the gap space between the guard plates in assembly is about three quarter to one inch wide.

According to one embodiment, a method for harvesting buds and/or flowers from a plant branch using an electric trimmer is provided, the electric trimmer having an electric motor and power source, a pair of blade plates, at least one of which is connected to an oscillator mechanism in the electric motor, and a pair of guard plates disposed one on each side of the at least one of the pair of blade plates, the guard plates hosting a matching radial or linear pattern of slots having a uniform spacing, a uniform slot width, the slots breaking out past at least one edge of the guard plates, the guard plates in assembly creating a gap space there between, the method including (a) Positioning the plant branch in alignment with an aligned slot pair of the guard plates on the trimmer, the cut end of the branch facing away from the operator, (b) Powering on the electric trimmer and blade plate(s), (c) Feeding the plant branch through the aligned slots in the guard plates while the blade plate(s) are oscillating, and (d) Catching the buds and or flowers that fall from the guard plate gap space in a container disposed beneath the electric trimmer.

In one aspect of the method, the blade plates are one sided having cutting edges on one side of the blade set. In another aspect of the method, the blade plates are two sided blades having cutting edges on both sides of the blade set. In one aspect, in (a) and in (c), the branches are secondary branches of a cannabis plant. In one aspect of the method, in (d) the electric trimmer is mounted over or mounted the container during the trimming operation. In a variation of this aspect in (b), the trigger portion of the trimmer is modified to enable the power to the blade set to remain on without human intervention. In one aspect, the electric trimmer further includes a transparent safety shield mounted at about 45 degrees back from the blade set toward the operator side of the electric trimmer. In one aspect, the gap space between the guard plates in assembly is about three-quarters to one inch wide.

DETAILED DESCRIPTION OF THE INVENTION

In various embodiments described in enabling detail herein, the inventor provides a unique method and apparatus for automatic removal of bud and flower in the harvesting of plants. A goal of the present invention is to provide an electric trimmer that is adapted to buck off buds and flowers without deforming them. Another goal of the invention is to reduce costs and manual labor workload relative to plant harvesting. A further goal of the invention is to provide a trimmer device that may be shared by several workers in the field. The present invention is described using the following examples, which may describe more than one relevant embodiment falling within the scope of the invention.

Figure 1:
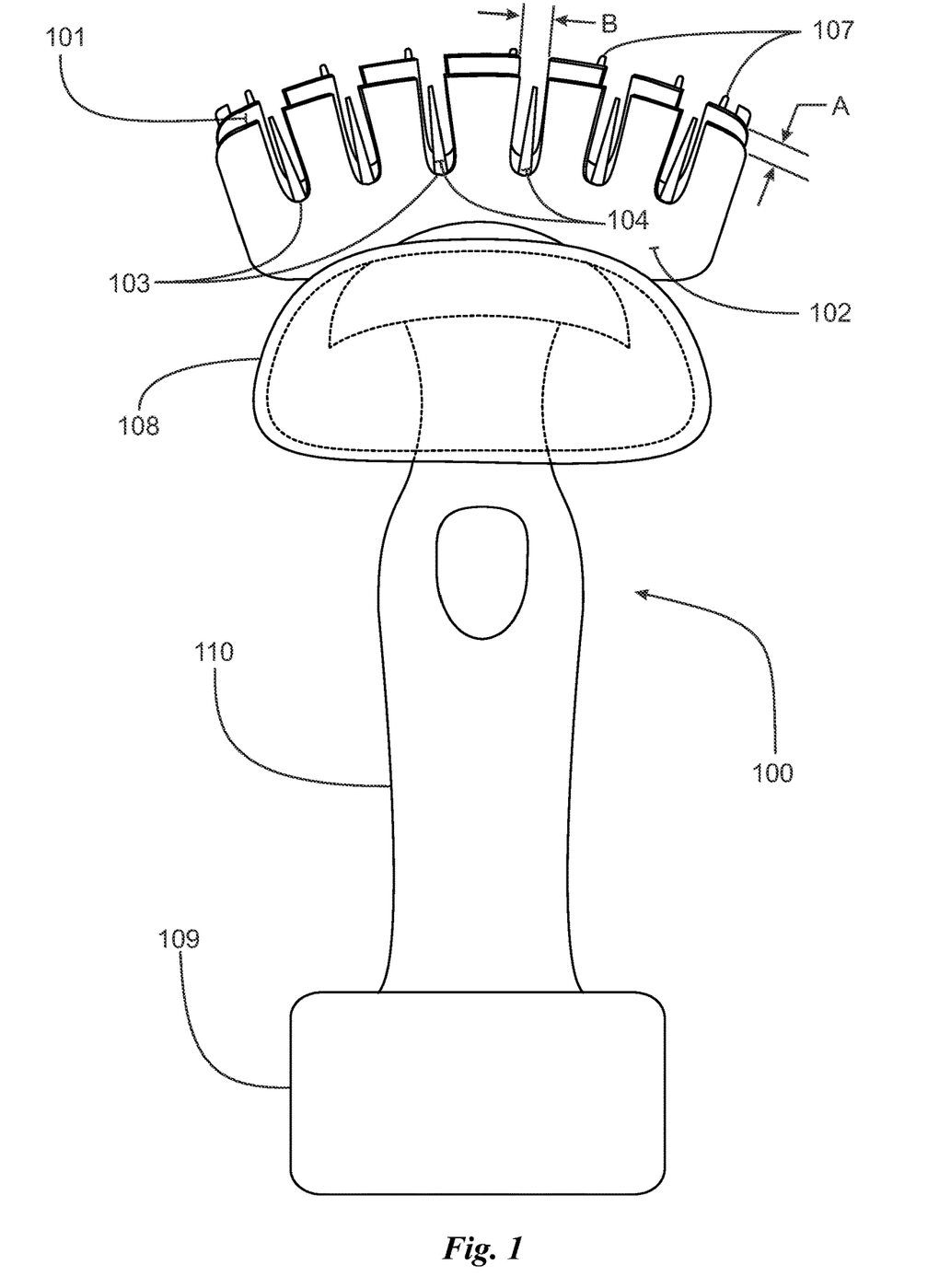
FIG. 1 is an overhead view of a trimmer device adapted for bud and flower removal according to an embodiment of the present invention.

FIG. 1 is an overhead view of a trimmer device 100 adapted for bud and flower removal according to an embodiment of the present invention. Trimmer device 100 may be a grass trimmer equipped with a fixed or non-oscillating blade plate 107 and an adjacently mounted parallel oscillating blade plate 104. In this embodiment, the oscillating blade plate 104 may be spaced apart from fixed blade plate 107 by as much as one inch or more, typically for the purpose of cutting grass to a specific depth with the fixed bale near or on the ground. An electric motor and a set of gears provided in the trimmer device and connected to the oscillation blade plate 104 provide the oscillation necessary to cut grass. The rate of oscillation may be as high as 2,500 strokes per minute.

Trimmer device 100 is a cordless trimmer device utilizing a rechargeable battery 109 and a handle body 110 including a power trigger and other typical controls relative to power on and off, motor speed, blade separation distance, and so on. Trimmer device 100 includes a transparent safety shield 108 to prevent debris from being kicked back by the blades toward the operator. For grass trimming, shield 108 may be set about 45 degrees in angle from the blade set. In one embodiment, trimmer device 100 may be powered by an electrical cord plugged into to a power source outlet.

In this embodiment, electric trimmer device 100 is modified for a unique purpose of trimming buds or flowers off of a primary or secondary plant stock such as a cannabis plant stalk or other type of plant stock where buds and/or flowers need to be harvested from. In a cannabis plant, the buds or flowers typically grow on the sides of the primary and secondary plant stalks. In this embodiment, a pair of elongate guard plates 101 and 102 are provided and installed on either side of blade plate 104.

Guard plates 101 and 102 may be of a same interchangeable design and may be bolted into the trimmer head blade set using the hole-patterns 103 in the fixed and oscillating blade plates 107 and 104, respectively. It may be noted herein that blade plate 104 may be substituted for two oscillating blades that oscillate in opposing directions. In this example, one blade plate 104 oscillates relative to fixed blade plate 107, the overlap contributing to the cutting action of the tool.

Guard plates 101 and 102 may be fabricated of sheet metal or other durable metals or materials including aluminum, steel, hard plastic, etc. Guard plates 101 and 102 may be about one eight of an inch in thickness. In assembly, guard plates 101 and 102 are spaced apart from the other creating a fixed gap space A between the guards. Gap space A may be controlled by spacer hardware in mounting the guard plates and may be about three quarter to over an inch or so wide depending on depth adjustment capabilities of the trimmer being adapted.

Guard plates 101 and 102 are arcuate in profile and may be stamped or sheared parts having an identical shape and size and may include an aligned (in assembly) pattern of radial slots that are placed through the material and break out at one side of either of the guard plates. In the case of trimmer device 100, there are 6 matching slots in each guard plate wherein the slots may be roughly the same length and width with each slot spaced equally apart and radially aligned according to angle in this case. The entire span of the cutting apparatus of trimmer device 100 may be about six and one-half inches across though that should not be construed as any limitation as tools with longer blade profiles are available in the art. There may be more, or fewer slots provided in guard plates 101 and 102 than are illustrated in this embodiment.

In an embodiment where an operator is bucking off buds or flowers using trimmer 100, the operator would feed a branch loaded with buds or flowers cut end away from the position of the operator into one of the slots orthogonal to the cutting blade plates and allow the blade plate 104 to separate the buds or flowers from the stalk or branch. In a preferred embodiment, the width dimension of the guard plate arrangement of trimmer 100 is greater than the reach of cutter plate 104 such that buds and flowers may be separated from the stalk without cutting up the stalk. In one embodiment, the orientation of trimmer device 100 for bucking off buds or flowers from a plant stalk is elevated from a grass cutting position, vertical, and wherein the trimmer stack may be intentionally angled to one side so that the buds and flowers trapped within the gap space of the guard plates may fall easily into a container below the operation. In one embodiment, trimmer device 100 may be mounted to the edge of a container and operated over the container so that all of the buds and flowers bucked off of the stalks fall right out of the gap space and into the container.

Figure 2:
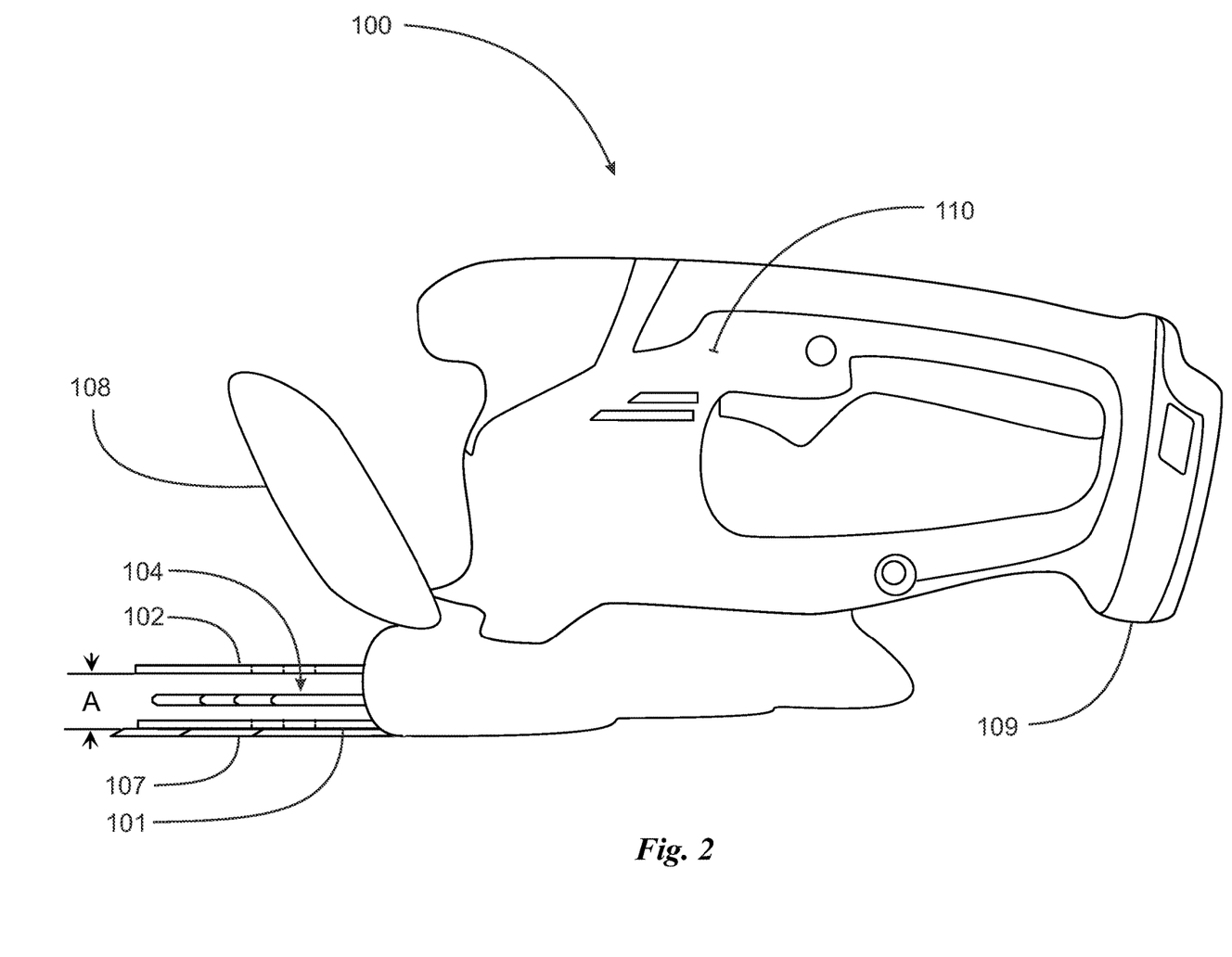
FIG. 2 is a side view of the trimmer device of FIG. 1 depicting spatial arrangement of blades and blade guards.

FIG. 2 is a side view of trimmer device 100 of FIG. 1 depicting spatial arrangement of blades and blade guards. In this embodiment, trimmer device 100 is logically represented inside elevation view. Handle body 110 supports plug-in battery 109 and the various controls including a trigger for oscillating blade plate 104. Shield 108 protects the operator from debris that may escape the gap space A between guard plates 101 and 102.

In this embodiment, trimmer 100 has fixed blade plate 107 at bottom with guard plate 101 installed over blade plate 107 on the bottom side of oscillating blade plate 104. Guard plate 102 is installed on the other side of the blade plate(s) 104 creating gap space A of three quarter to one inch or so in width. In one embodiment, trimmer 100 includes an alternative blade plate set that is adapted for trimming hedges whereas the trimmer may be set up by the operator in assembly to have longer hedge trimming blades or the accurate grass trimming blade profile depicted herein.

The slots in the guard plates 101 and 102 are adapted to be wide enough for an operator to insert a stalk with bud or flowers through the slot while the blade plate(s) 104 are in a state of oscillation (shearing action). In one embodiment, an adaptation may be provided for the purpose of keeping trimmer device 100 oscillating without having to depress and hold the power trigger. In one embodiment, the trimmer device 100 may be mounted and powered on and locked on while one or two operators are feeding the slots with secondary branches containing buds or flowers.

Figure 3:
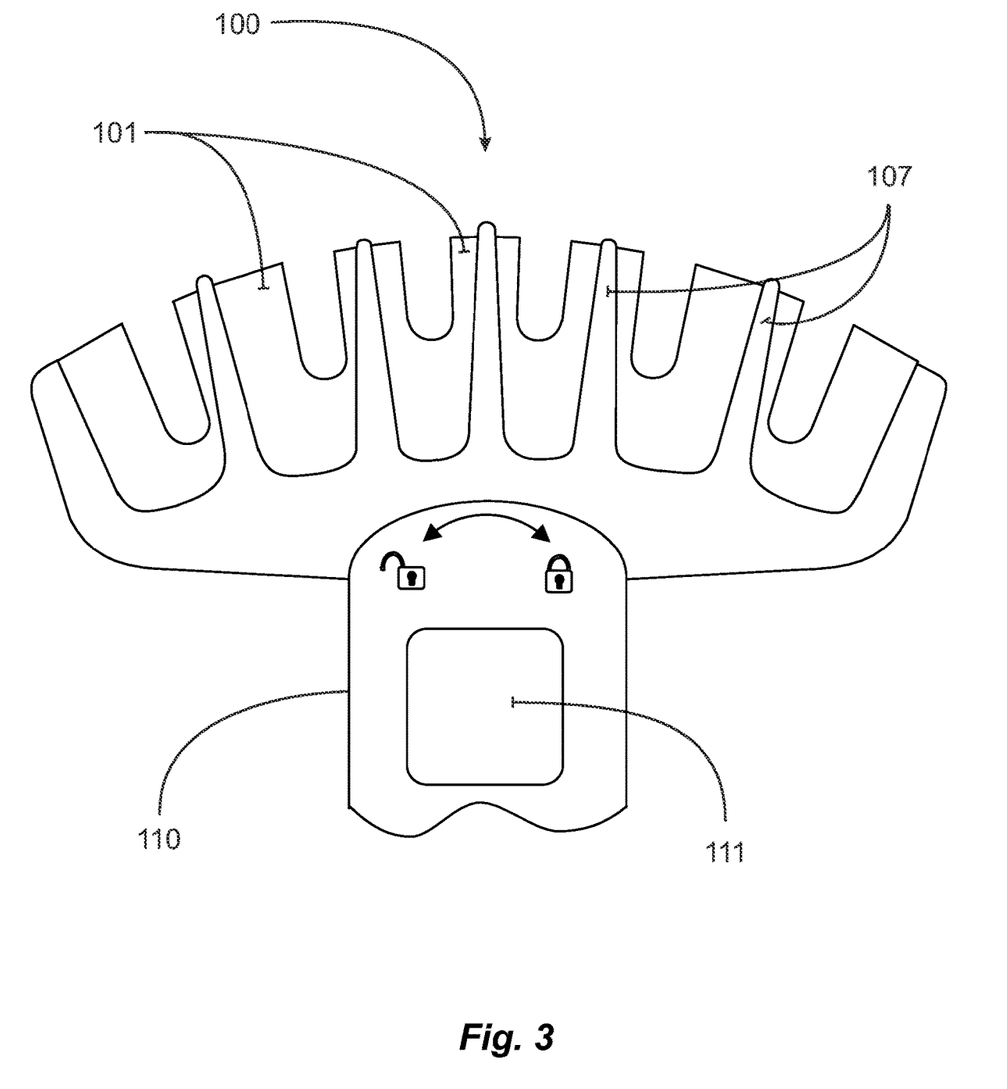
FIG. 3 is bottom view of the trimmer device of FIG. 1 depicting the stationary blade and aligned blade guards.

FIG. 3 is bottom view of trimmer device 100 of FIG. 1 depicting the stationary blade and aligned blade guards. Trimmer device 100 includes a fixed blade plate 107 in this example, which is wholly visible in this bottom view. Guard plate 101 is adjacent to the fixed blade plate 107. Blade plate(s) 104 are removed from this view for clarity. In this embodiment, a plate lock/unlock switch 111 is provided to unlock fixed blade 107 allowing it to be removed along with other components like blade plate 104 and guards 101 and 102. In a preferred embodiment, trimmer device 100 maybe converted back into a grass trimmer by removing guard plates 101 and 102 and reinstating fixed blade plate 107 and oscillating blade plate(s) 104.

Figure 4:
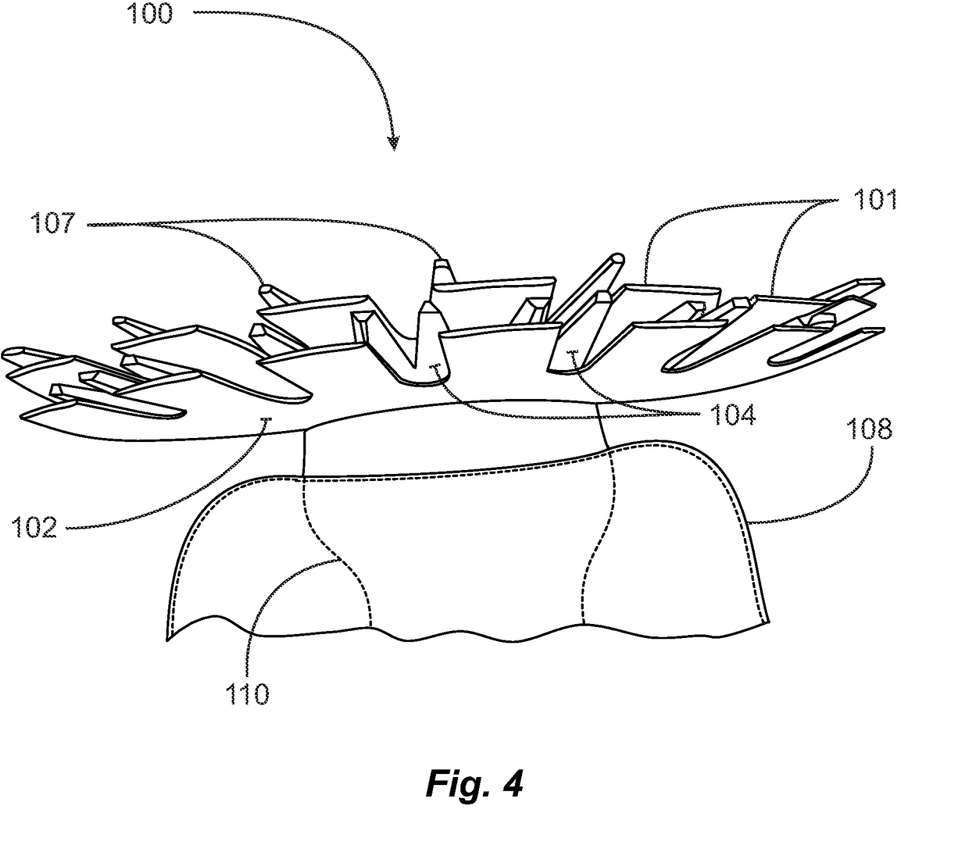
FIG. 4 is an inverted, partial perspective view of the trimmer device of FIG. 1 depicting the arrangement of trimmer blades and guards.

FIG. 4 is an inverted, partial perspective view of trimmer device 100 of FIG. 1 depicting the arrangement of trimmer blade plates and guard plates. In this embodiment, trimmer device 100 includes fixed blade plate 107 and oscillating blade plate 104; however, in other embodiments, trimmer device 100 may include two oscillating blade plates 104 and may or may not include a fixed blade plate 107 without departing from the spirit and scope of the present invention.

Fixed blade plate 107 is mounted on the bottom side of the trimmer device opposite the handle side of the device. Guard plate 101 is installed adjacent to fixed blade plate 107 and may be spaced apart from the blade plate using spacers. Oscillating blade plate 104 is installed roughly at center in the gap between the guard plates 101 and 102.

The guard plate assembly is open at the bottom so that buds and flowers cut within the gap created by the guard plates may fall out into an open container placed beneath the trimmer device 100. In one embodiment, trimmer device 100 may be purposely mounted over an open container so that the buds and flowers are captured during the bucking operation. Safety shield 108 and handle body 110 are partially depicted in this view.

Figure 5:
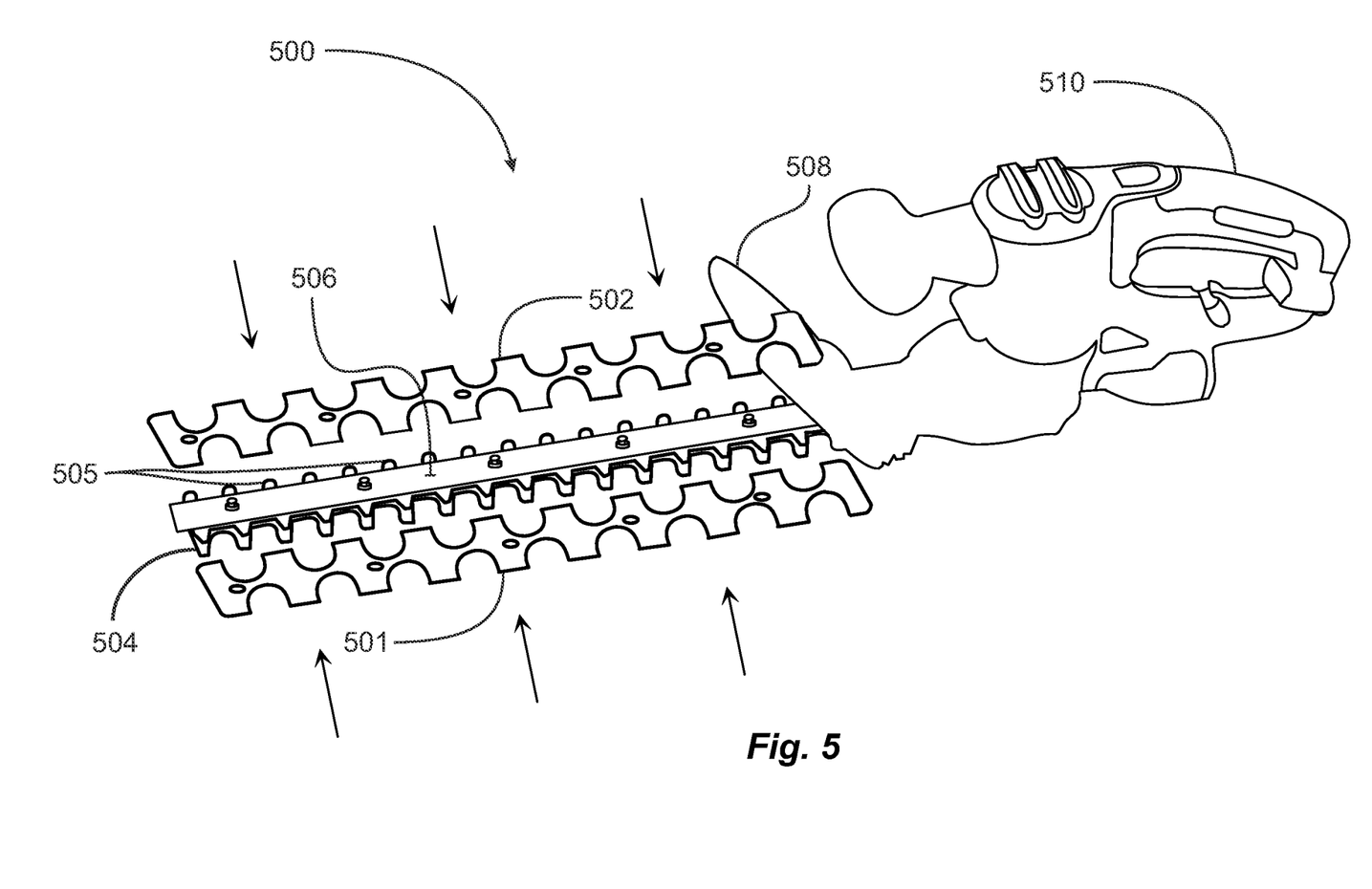
FIG. 5 is an exploded perspective view of a trimmer device that may be adapted with bucking guards according to another embodiment.

FIG. 5 is an exploded perspective view of a trimmer device 500 that may be adapted with bucking guard plates according to another embodiment. Trimmer device 500 is adapted, in this embodiment, as a hedge trimmer device having a much longer blade plate profile wherein the oscillation is longitudinal with the blade plate(s). In one embodiment, the trimmer device 100 of FIG. 1 may be adapted as a hedge trimming device rather than a grass trimming device by swapping out the blade components from the grass trimming set to the hedge trimming set.

Trimmer device 500 includes a long trimmer bar 506 that extends straight out from handle body 510. Trimmer bar 506 may range in length depending on a device model and design and may be provided from about 12 inches to about 36 inches without departing from the spirit and scope of the invention. Trimmer bar 506 provides support for a pair of trimmer blade plates 504 and 505. Trimmer blade plates 504 and 505 are elongate and may cut in both directions rather than being limited to cutting in one direction like trimmer device 100. In one embodiment, one of trimmer blade plates 504 or 505 may be a fixed blade plate that does not oscillate back and forth. In one embodiment, both blade plates oscillate longitudinally in opposing direction the cutting action occurring during overlap of the blade teeth along the longitude of the configuration.

In this embodiment, elongate guard plates referenced herein as guard plate 501 and guard plate 502 may be provided in an elongated form so as to cover the specified length of blade plates 504. Guard plates 501 and 502 may be stamped sheet metal parts or otherwise interchangeable metal parts fabricated to length and width dimensions that are relevant to the blade plate dimensions. Guard plates 501 and 502 may be about one eight of an inch in thickness.

Guard plates 501 and 502 are depicted in exploded view with one guard plate on either side of the blade plates 504 and support bar 506. In this embodiment, the guard plates are installed according to the direction of the arrows or guard plate 501 on the bottom side and guard plate 502 on the top side. Guard plates 501 and 502 may be spaced apart from the bar 506 and from blade plate 504 using spacers. In this embodiment a gap may be maintained in between guard plates 501 and 502 of about three-quarters of an inch to an inch wide.

Guard plates 501 and 502 share a matching slot pattern of slots that may occupy both sided of each guard plate, the slots breaking out at both long edges of the guard plate. The slots are equally spaced and linear in this case. In assembly, the slot pattern allows one or more operator to utilize a matching slot pattern to insert branches by pushing them into the slot away from the operator to buck the branches of buds and or flowers. In this case, there are nine slots in the guard plates of trimmer device 500 as opposed to only six slots in the guard plates of trimmer device 100 of FIG. 1.

Trimmer device 500 has a much longer cutting span being the length of bar 506. Therefore, several workers may share one trimmer device 500 each worker using a different slot in the guard plates for bucking off buds or flowers. It may be noted herein that trimmer device 500 may be intentionally positioned at a ninety-degree angle from the horizontal position used to trim the top of a hedge and mounted over a collection bin so that operators may share the device to trim multiple branches simultaneously. Likewise, trimmer device 500 may be modified to stay on once switched on so that an operator is not forced to depress the trigger continuously.

Figure 6:
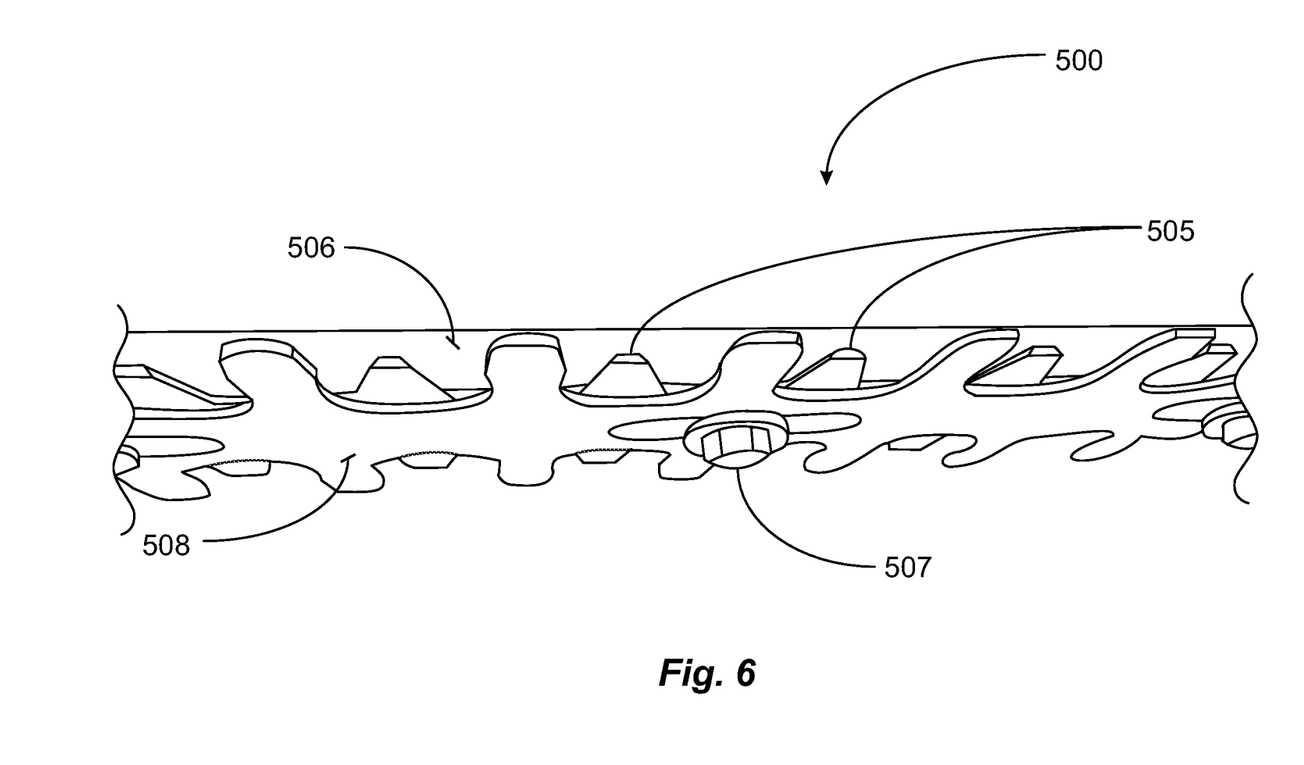
FIG. 6 is a partial exploded view of the device of FIG. 5 depicting one blade guard adjacent to the trimmer blades.

FIG. 6 is a partial exploded view of the device of FIG. 5 depicting one fixed blade plate adjacent to a trimmer blade plate. In this view, a fixed blade plate 508 is bolted to blade plate 504 and support bar 506. In this embodiment blade plate 506 oscillates longitudinally and blade plate 504 remains stationary. In this embodiment, bolts 507 may be removed and guard plates like guard plates 501 and 502 (not depicted) of FIG. 5 may be installed as was described above. Maintaining a gap space between the guard plates of three-quarters of an inch or greater may be accomplished by uniform spacing of the guard plates out from the blade plates where spacers may be utilized. The trimmer device of the present invention may be provided using a wide variety of stock hand-held trimming devices whether they are powered by a battery or plugged into a power source using electrical cord.

It will be apparent to a person with skill in the art that the trimmer device and method of harvesting buds or flowers of the present invention may be provided using some or all the components described herein and referenced by element numbers. The arrangement of components and functionality thereof relative to the trimmer device of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. An electric trimmer including:
   an electric motor and power source;
   a pair of blade plates, at least one of which is connected to an oscillator mechanism in the electric motor; and
   a pair of guard plates disposed one on each side of the at least one of the pair of blade plates, the guard plates hosting a matching radial or linear pattern of slots having a uniform spacing, a uniform slot width, the slots breaking out past the edge of the guard plates, the guard plates, in assembly, creating a gap space there between;
   characterized in that one or more operators may insert branches having buds or flowers thereon through any one of the matching slots in the slot pattern, the branch oriented orthogonal to the blade set with the blade plates oscillating to harvest the buds or flowers within the gap space.

2. The electric trimmer of claim 1, wherein the blade plates are two-sided blades having cutting edges on both sides of the blade set.

3. The electric trimmer of claim 1, wherein the branches are secondary branches of a cannabis plant.

4. The electric trimmer of claim 1, wherein the guard plates are removably attached parts stamped or sheared to form from sheet metal.

5. The electric trimmer of claim 1, wherein the power source for the electric trimmer is a rechargeable battery.

6. The electric trimmer of claim 1, wherein the power source for the electric trimmer is accessed by a power outlet by a plug-in cord connected to the electric trimmer.

7. The electric trimmer of claim 1, further including a lock and unlock switch for unlocking the trimming assembly to enable diss-assembly and reassembly of the blade plates and guard plates.

8. The electric trimmer of claim 1, further including a container adapted to catch falling buds and flowers harvested during the trimming operation.

9. The electric trimmer of claim 8, wherein a power trigger portion of the trimmer is modified to enable the power to the blade set to remain on without further human intervention.

10. The electric trimmer of claim 1, further including a transparent safety shield mounted at about a 45 degrees angle from the blade set toward the operator side of the electric trimmer.

11. The electric trimmer of claim 1, wherein the gap space between the guard plates in assembly is about three-quarters inch to one inch wide.

12. A method for harvesting buds and or flowers from a plant branch using an electric trimmer having an electric motor and power source, a pair of blade plates, at least one of whic h is connected to an oscillator mechanism in the electric motor, and a pair of guard plates disposed one on each side of the at least one of the pair of blade plates, the guard plates hosting a matching radial or linear pattern of slots having a uniform spacing, a uniform slot width, the slots breaking out past the edge of the guard plates, the guard plates in assembly creating a gap space there between, comprising the steps:
   (a) Positioning the plant branch in alignment with an aligned slot pair of the guard plates on the trimmer, the cut end of the branch facing away from the operator;
   (b) Powering on the electric trimmer and blade plates;
   (c) Feeding the plant branch through the aligned slots in the guard plates while the blade plates are oscillating; and
   (d) Catching the buds and or flowers that fall from the guard plate gap space in a container disposed beneath the electric trimmer.

13. The method of claim 12, wherein the blade plates are two-sided blades having cutting edges on both sides of the blade set.

14. The method of claim 12, wherein in (a) and in (c), the branches are secondary branches of a cannabis plant.

15. The method of claim 12, wherein in (d), the electric trimmer is mounted to the container during the trimming operation.

16. The method of claim 12, wherein in (b) a trigger portion of the trimmer is modified to enable the power to the blade set to remain on without further human intervention.

17. The method of claim 12, wherein the electric trimmer further includes a transparent safety shield mounted at about a 45 degrees angle from the blade set toward the operator side of the electric trimmer.

18. The method of claim 12, wherein the gap space between the guard plates in assembly is about three-quarters inch to one inch wide.

* * * * *